United States Patent Office 3,816,510
Patented June 11, 1974

---

3,816,510
PROCESS FOR PREPARING UNSYMMETRICALLY SUBSTITUTED DIBASIC ACIDS
Stephen N. Massie, Palatine, Ill., assignor to Universal Oil Products Company, Des Plaines, Ill.
No Drawing. Filed Feb. 8, 1971, Ser. No. 113,721
Int. Cl. C07c 101/18
U.S. Cl. 260—482 R                     8 Claims

ABSTRACT OF THE DISCLOSURE

Substituted dibasic acids, and particularly unsymmetrically substituted dibasic acids, are prepared by treating a dibasic acid imide with an acide anhydride followed by treatment with an alcohol. The products thus produced comprise compounds containing an ester at one end and an amide or N-substituted amide at the other end.

---

This invention relates to a process for producing substituted dibasic acids. More specifically, the invention is concerned with the process for producing unsymmetrically substituted dibasic acids. Compounds containing the structure of the end products of the reaction hereinafter set forth in greater detail are useful in the chemical industry as plasticizers or intermediates in the formation of polymers. The compounds will thus be useful as hardeners or as compounds which produce the hardening of certain polymers or plastics. By utilizing the process of the present invention it is possible to obtain reaction products which contain an ester at one end of the chain and an amide or N-substituted amide on the other end of the chain.

It is therefore an object of this invention to provide a process for the preparation of unsymmetrically substituted dibasic acids.

In one aspect an embodiment of this invention resides in a process for the preparation of unsymmetrically substituted dibasic acids which comprise treating a dibasic acid imide with an acid anhydride at reaction conditions, thereafter treating the resulting intermediate with an alcohol at reaction conditions, and recovering the resultant unsymmetrically substituted dibasic acid.

A specific embodiment of this invention is found in a process for the preparation of unsymmetrically substituted dibasic acid which comprises treating succinimide with acetic anhydride at a temperature in the range of from about ambient to about 300° C. and a pressure in the range of from atmospheric to about 100 atmospheres, thereafter treating the resulting intermediate with ethyl alcohol at a temperature in the range of from about ambient to about 300° C. and a pressure in the range of from atmospheric to about 100 atmospheres, and recovering the resultant ethyl N-acetylsuccinamate and ethyl succinamate.

Other objects and embodiments will be found in the following further detailed description of the present invention.

As hereinbefore set forth the present invention is concerned with a process for preparing substituted dibasic acids, and more particularly to a process for preparing unsymmetrically substituted dibasic acids. The process of this invention is effected by treating an appropriate dibasic acid imide with an acid anhydride and thereafter treating the resulting intermediate with an alcohol. The reaction conditions under which the process of this invention is effected will include temperatures in the range of from ambient (24° C.) up to about 300° C. or more and at a pressure ranging from about atmospheric up to about 100 atmospheres. In the event that superatmospheric pressures are to be employed, said pressures are afforded by the introduction of a substantially inert gas such as nitrogen into the reaction zone or apparatus, the desired operating pressure being that which is sufficient to maintain a major portion of the reactants in the liquid phase. The aforementioned reaction conditions of temperature and pressure will apply to both steps of the process. It is also contemplated within the scope of this invention that preparation of the unsymmetrically substituted dibasic acids may be effected in the presence of a substantially inert solvent such as, for example, paraffinic hydrocarbons including n-pentane, n-hexane, n-heptane, etc.; aromatic hydrocarbons such as benzene, toluene, o-xylene, m-xylene, p-xylene, ethylbenzene, etc.; or ethers such as dimethyl ether, diethyl ether, di-n-propyl ether, diisopropyl ether, ethylene glycol dimethyl ether, etc.

Examples of dibasic acid imides which comprise one of the starting materials of the present process will include saturated dibasic acid imides such as succimide, glutarimide, adipimide, palmimide, suberimide, azelaim-ide, sebacimide, etc. In addition, it is also contemplated that unsaturated dibasic acid imides such as malimide, pentene imide, hexene imides, hexadiene imide, heptene imides, heptadiene imides, octene imides, octadiene imides, etc., may also be used but not necessarily with equivalent results. The acid anhydrides which are utilized to treat the aforementioned dibasic acid imides will include acetic anhydride, propionic anhydride, butyric anhydride, valeric anhydride, caproic anhydride, heptanoic anhydride, caprylic anhydride, nonanoic anhydride, capric anhydride, etc.

The intermediate which results from the treatment of the aforementioned imides with the acid anhydrides is further treated utilizing an alcohol, and preferably an aliphatic alcohol containing from one to twelve or more carbon atoms, said alcohol including methyl alcohol, ethyl alcohol, n-propyl alcohol, isopropyl alcohol, n-butyl alcohol, sec-butyl alcohol, t-butyl alcohol, n-amyl alcohol, isoamyl alcohol, n-hexyl alcohol, isohexyl alcohol, octyl alcohols, nonyl alcohols, decyl alcohols, undecyl alcohols, dodecyl alcohols, etc. Aromatic alcohols such as phenol, cresol, catechol, hydroquinone, etc., or aromatic substituted alcohols such as benzyl alcohol, α- and β-phenethyl alcohol may also be used, but not necessarily with equivalent results.

The process of this invention may be effected in any suitable manner and may comprise either a batch or continuous type operation. For example, when a batch type operation is used, a quantity of the appropriate dibasic acid imide and the acid anhydride is placed in a reaction vessel. The reactants may be present in the reaction vessel in a mol ratio of from about 1:1 to about 50:1 mols of acid anhydride per mol of dibasic imide. If superatmospheric pressures are to be employed in the process, the reaction vessel may comprise an autoclave of the rotating or mixing type. The reactor is then heated to the desired temperature within a range hereinbefore set forth in greater detail and maintained thereat for a predetermined residence time, said residence time ranging from about 1 to about 100 hours or more in duration. At the end of this reaction time, the reactor is then allowed to return to room temperature, and the alcohol is thereafter added, said alcohol being present in an excess. If so desired, any unreacted acid anhydride which is still present in the reaction zone may be removed by conventional means such as distillation prior to the addition of the alcohol. After addition of the alcohol, the reactor is then reheated to the desired operating temperature and, if so desired, to the desired superatmospheric pressure level and maintained at the desired operating conditions for an additional period of from about 1 to about 10 hours or more. At the end of the second reaction period, the vessel is then allowed to return to room temperature and the reaction mixture is recovered therefrom. The mixture is then subjected to conventional means of purification such as extraction, washing, drying, fractional distillation, etc., whereby the desired products comprising the unsymmetrically substituted dibasic acids are recovered.

It is also contemplated within the scope of this invention that the process may be effected in a continual manner of operation. When such a type of operation is used, the starting materials comprising the dibasic acid imide and the acid anhydride are continuously charged to the reaction zone which is maintained at the proper operating conditions of temperature and pressure. In addition, if so desired, a solvent of the type hereinbefore set forth may also be introduced into the reaction zone through a separate line or, in the alternative, may be admixed with one or both of the starting materials and charged to the reactor along with said materials. Upon completion of the desired residence time, the reactor effluent is continuously withdrawn and subjected to separation means whereby the intermediate is separated from any unreacted starting materials which may still be present. The unreacted starting materials may be recycled to the first reaction zone to form a portion of the feed stock, while the intermediate is charged to the second reactor. In addition, the alcohol which is utilized for treatment of the intermediate is also continuously charged to the second reactor through a separate line. Upon completion of the desired residence time in the second reactor which is also maintained at the proper operating conditions of temperature and pressure, the reactor effluent is continuously withdrawn and subjected to conventional means of separation similar to those hereinabove set forth whereby the desired unsymmetrically substituted dibasic acids are recovered.

Examples of unsymmetrically substituted dibasic acids which may be prepared according to the process of this invention will include those compounds having the generic formula:

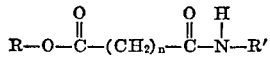

in which R is selected from the group consisting of alkyl containing from 1 to about 12 carbon atoms, aromatic and substituted aromatic radicals, R' is hydrogen or an acyl radical and $n$ is an integer of from 2 to about 8, specific examples of these compounds being methyl N-acetylsuccinamate, methyl N-propionylsuccinamate, methyl N-butyrylsuccinamate, methyl N-acetylglutaramate, methyl N-propionylglutaramate, ethyl N-butyrylglutaramate, ethyl N-(o-carboxybenzoyl)-succinamate, propyl N-(o-carboxybenzoyl)glutaramate, propyl N-acetyladipamate, isopropyl N-propionyladipamate, isopropyl N-butyryladipamate, isopropyl N-(o-carboxybenzoyl)adipamate, benzyl N-acetylpalmamate, benzyl N-propionylpalmamate, methyl N-butyrylpalmamate, methyl N-(o-carboxybenzoyl)palmamate, methyl N-acetylsuberamate, ethyl N-propionylsuberamate, ethyl N-butyrylsuberamate, ethyl N-(o-carboxybenzoyl)suberamate, etc., methyl succinamate, ethyl succinamate, n-propyl succinamate, isopropyl succinamate, n-butyl succinamate, methyl glutaramate, ethyl glutaramate, n-propyl glutaramate, isopropyl glutaramate, n-butyl glutaramate, methyl adipamate, ethyl adipamate, n-propyl adipamate, isopropyl adipamate, n-butyl adipamate, methyl palmamate, ethyl palmamate, n-propyl palmamate, isopropyl palmamate, n-butyl palmamate, etc. It is to be understood that the aforementioned unsymmetrically substituted dibasic acids are only representative of the class of compounds which may be prepared, and that the present invention is not necessarily limited thereto.

The following examples are given to illustrate the process of the present invention which, however, are not intended to limit the generally broad scope of the present invention in strict accordance therewith.

EXAMPLE I

In this example, 0.01 mol of succinimide and 0.5 mol of acetic anhydride were placed in the closed glass vessel and heated at a temperature of 80° C. for a period of 72 hours. At the end of this time, heating was discontinued, the vessel was allowed to return to room temperature, opened and 1.0 mol of ethanol added thereto. The reaction vessel was then reheated to a temperature of about 80° C. and maintained at this temperature until all of the lower boiling components had been removed. The reaction mixture was then recovered and the remaining oil was extracted with diethyl ether to dissolve the desired product and remove it from the unreacted succinimide which is ether-insoluble. The ether extract was separated from the bulk of said insoluble succinimide and the extract was heated on a steam bath to evaporate the ether. The oil residue was again extracted with ether and subjected to the same treatment, traces of the succinimide being removed therefrom. The resulting oil residue was then dried and neutralized over anhydrous potassium carbonate and reduced in volume in a rotary evaporator. The oil was analyzed by means of Nuclear Magnetic Resonance which disclosed the presence of ethyl N-acetylsuccinamate in an amount of 62 mol percent and ethyl succinamate in an amount of 38 mol percent.

EXAMPLE II

A mixture of 0.02 mol of glutarimide and 0.5 mol of acetic anhydride is placed in a glass vessel which is sealed and heated to a temperature of 100° C. for a period of 72 hours. At the end of this time, heating is discontinued, the vessel is allowed to return to room temperature and opened. Following this, 1.0 mol of propyl alcohol is added thereto, the vessel is allowed to remain open and reheated to a temperature of 100° C. After removal of the lower boiling components is completed, the heating is again discontinued and the reaction product, after cooling to room temperature, is recovered. The reaction mixture is treated with diethyl ether and the ether extract is separated from unreacted glutarimide. The ether extract is treated in a manner similar to that set forth in Example I above and after drying is subjected to analysis by means of Nuclear Magnetic Resonance. This analysis will disclose the presence of propyl N-acetylglutaramate and propyl glutaramate.

EXAMPLE III

In like fashion, a mixture of 0.1 mol of succinimide and 0.5 mol of acetic anhydride is placed in the glass liner of a rotating autoclave. The autoclave is sealed and nitrogen is pressed in until an initial pressure of 25 atmospheres is reached. The autoclave is heated to a temperature of 150° C., maintained thereat for a period of 10 hours. At the end of this time, heating is discontinued, the autoclave is allowed to return to room temperature, the excess pressure is discharged and the autoclave is opened. To the autoclave is added 1.0 mol of methyl alcohol and thereafter the autoclave is allowed to remain open while heating to a temperature of 80° C. until all of the lower boiling components of the mixture have boiled off. The remaining oil is then treated in a manner similar to that set forth in Example I above, the presence of the desired products comprising methyl N-acetylsuccinamate and methyl succinamate being verified by means of Nuclear Magnetic Resonance analysis.

EXAMPLE IV

In this example a mixture comprising 0.01 mol of succinimide and 0.2 mol of propionic anhydride is placed in a closed glass vessel and heated to a temperature of 100° C. for a period of 72 hours. Upon completion of this residence time, heating is discontinued, the vessel is allowed to return to room temperature and opened. Thereafter, 1.0 mol of methyl alcohol is added to the mixture and the vessel again heated to a temperature of 80° C. without sealing the same. Upon completion of the removal of all of the lower boiling components of the mixture, heating is again discontinued, the reaction mixture is extracted with diethyl ether and separated from unreacted starting materials. The ether extract is placed on a steam bath to evaporate the ether, extracted again with an additional amount of ether, treated with anhydrous potassium carbonate to remove water and residual propionic acid and reduced in volume in a rotary evaporator. Analysis of the product will disclose the presence of methyl N-propionylsuccinamate and methyl succinamate.

EXAMPLE V

In this example a mixture comprising 0.01 mol of succinimide, 0.1 mol of phthalic anhydride and 1 mol of benzene is placed in the glass liner of a rotating autoclave. The autoclave is sealed. Nitrogen is pressed in until an initial operating pressure of 25 atmospheres is reached and the autoclave is then heated to a temperature of 200° C. The autoclave and contents thereof are maintained at this temperature for a period of 10 hours, after which heating is discontinued, the autoclave allowed to return to room temperature and the excess pressure is discharged. The autoclave is then opened and 1.0 mol of ethyl alcohol is added thereto. The autoclave is then heated to a temperature of 100° C. and maintained thereat until all the lower boiling components of the mixture have been removed. Heating is then discontinued, the reaction mixture is recovered and subjected to treatment similar in nature to that set forth in Example I above. Analysis of the residue by Nuclear Magnetic Resonance will disclose the presence of ethyl N-(o-carboxybenzoyl)succinamate and ethyl succinamate.

I claim as my invention:

1. A process for the preparation of unsymmetrically substituted dibasic acids which comprises reacting an imide of an unsubstituted dibasic acid of from 4 to 12 carbon atoms per molecule with an anhydride of an unsubstituted aliphatic acid of from 2 to 12 carbon atoms per molecule, thereafter reacting the resultant intermediate with an aliphatic alcohol of from 1 to about 12 carbon atoms per molecule, each of said reactions being effected at a temperature of from about ambient to about 300° C. and a pressure of from about atmospheric to about 100 atmospheres, and recovering the resultant unsymmetrically substituted dibasic acid.

2. The process a set forth in claim 1 in which said dibasic acid imide is a saturated dibasic acid imide.

3. The process as set forth in claim 2 in which said imide is succinimide.

4. The process as set forth in claim 1 in which said acid anhydride is acetic anhydride.

5. The process as set forth in claim 1 in which said imide is succinimide, said acid anhydride is acetic anhydride, said alcohol is methyl alcohol and said unsymmetrically substituted dibasic acids are methyl N-acetylsuccinamate and methyl succinamtae.

6. The process as set forth in claim 1 in which said imide is succinimide, said acid anhydride is acetic anhydride, said alcohol is ethyl alcohol and said unsymmetrically substituted dibasic acids are ethyl N-acetylsuccinamate and ethyl succinamate.

7. The process as set forth in claim 1 in which said imide is glutarimide, said acid anhydride is acetic anhydride, said alcohol is propyl alcohol and said unsymmetrically substituted dibasic acids are propyl N-acetylglutaramate and propyl glutaramate.

8. The process as set forth in claim 1 in which said imide is succinimide, said acid anhydride is propionic anhydride, said alcohol is methyl alcohol and said unsymmetrically substituted dibasic acids are methyl N-propionylsuccinamate and methyl succinamate.

References Cited

FOREIGN PATENTS 1,355,576  12/1962  France _____ 205—442

OTHER REFERENCES

Noller, Chemistry of Organic Cmpds (2nd. Ed.), p 797.

LORRAINE A. WEINBERGER, Primary Examiner

P. J. KILLOS, Assistant Examiner

U.S. Cl. X.R.

260—471 A